United States Patent
Fahlenberg

[11] 4,032,713
[45] June 28, 1977

[54] RECORDING TAPE CONTROL ARRANGEMENT FOR TELEPHONE ANSWERING APPARATUS

[75] Inventor: Paul Fahlenberg, Baierbrunn, Germany

[73] Assignee: Compur - Electronic Gesellschaft mit beschraenkter Haftung, Munich, Germany

[22] Filed: Mar. 14, 1975

[21] Appl. No.: 558,295

[30] Foreign Application Priority Data
Apr. 4, 1974 Germany .............. 2416374

[52] U.S. Cl. ................................................. 179/6 R
[51] Int. Cl.² ............................................. H04M 1/64
[58] Field of Search ............ 179/6 R, 6 E, 6 AC, 179/6 C; 360/74

[56] References Cited
UNITED STATES PATENTS

| | | |
|---|---|---|
| 2,058,096 | 10/1936 | Neuman ............... 179/6 R |
| 2,080,812 | 5/1937 | Fairbanks ............. 179/6 R |
| 3,879,756 | 4/1975 | De Bell et al. ......... 360/74 |

Primary Examiner—Raymond F. Cardillo, Jr.
Attorney, Agent, or Firm—Woodhams, Blanchard and Flynn

[57] ABSTRACT

A circuit arrangement for a telephone answering apparatus having an announcement text recorded on a magnetic tape which is moved from a starting position in a forward direction under the action of a driving motor and after a predetermined lapse of time from the end of the announcement recorded thereon is moved back in the opposite direction to its starting position. Control switching is provided which, when the starting position of the tape is reached, produces an OFF-pulse which arrests the driving motor.

11 Claims, 4 Drawing Figures

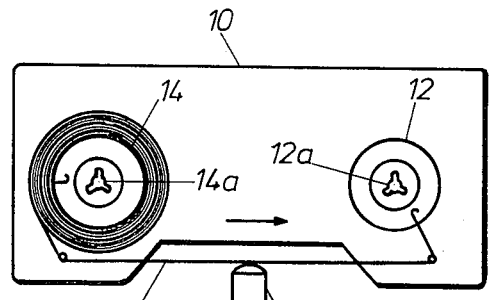
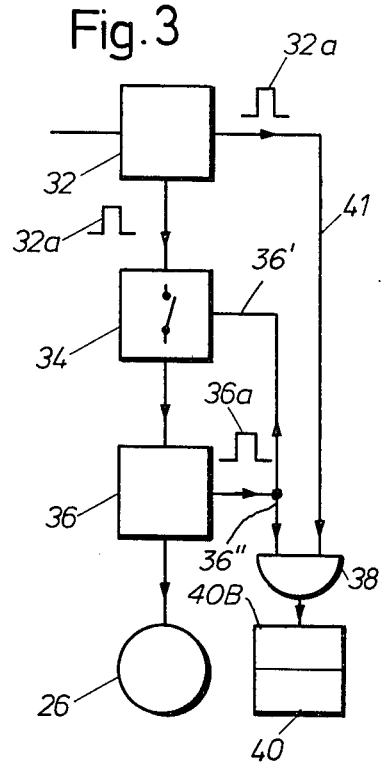
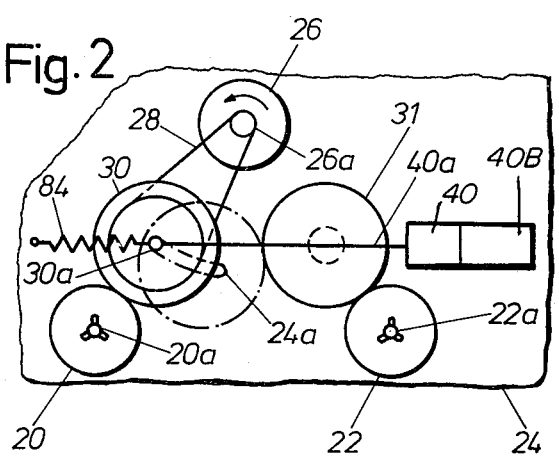
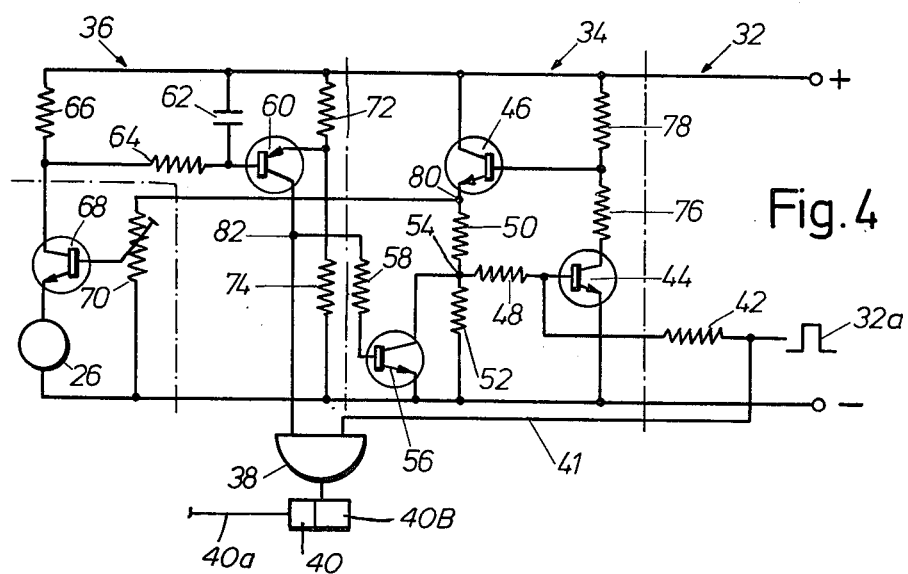

4,032,713

RECORDING TAPE CONTROL ARRANGEMENT FOR TELEPHONE ANSWERING APPARATUS

FIELD OF THE INVENTION

This invention relates to a circuit arrangement for a telephone answering apparatus having an announcement text recorded on a magnetic tape which, to answer a telephone call, it moved from a starting position in a wind-off or forward direction under the action of a driving motor and, after a predetermined lapse of time from the end of the announcement, is moved back in the opposite direction to its starting position, and including a control switching system which, when the starting position of the tape is reached, produces an OFF pulse which arrests the driving motor.

SUMMARY OF THE INVENTION

It is an object of the present invention to implement the control switching of the appliance in such a way that likewise the starting of the motor which moves the magnetic tape, and thus the commencement of the announcement, are brought about automatically.

This object is achieved in the present invention by the fact that an AND-gate is associated with the control switching system, and the OFF-pulse and a further control pulse are conducted to this gate, and that the presence of both pulses at the AND-gate initiates operation of the driving motor and a movement of the magnetic tape from the starting position.

In the case of a telephone answering apparatus in which the tape is wound from a wind-off reel on to a wind-up reel during the return movement whereby, after the starting position is reached, the beginning of the tape reaches the run-off reel and the OFF-pulse is produced by the increase or rise in current at the driving motor occurring in this tape position, in accordance with a preferred feature, the further control pulse fed to the AND-gate is a pulse which is acquired from the incoming ringing signals through the agency of a signal detector.

Frequently in telephone answering apparatus the direction of tape travel from one reel or the other of the tape cassette is determined by interposing or shifting of a driving wheel driven by the driving motor in one direction only. In constructions of this nature it is advantageous, in accordance with a further feature of the invention, to use an arrangement in which the AND-gate actuates an electromagnet, when the two pulses are present, in such a way that the driving wheel is applied to the wind-off reel.

In accordance with a further feature of the invention the OFF-pulse is initiated by a current variation detector which is associated with an RC-member for delay purposes.

Advantageously the further control pulse may be likewise produced by a switch which is closed by a manually-operated key.

BRIEF DESCRIPTION OF THE DRAWINGS

An embodiment of the invention is illustrated in the accompanying drawings and will now be described. In the drawings:

FIG. 1 illustrates a tape cassette which is used in a telephone answering apparatus, FIG. 2 illustrates means used in the appliance for operating the reels of this cassette, FIG. 3 is a block diagram illustrating the control switching for the apparatus, and FIG. 4 illustrates elements which are used in this control switching.

A cassette of known construction is illustrated in the drawings and this has a transparent housing 10 made of plastics material containing a wind-off reel 12 and a wind-up reel 14. The magnetic tape 16 is anchored to the two reels at its ends. When the wind-off reel 12 is turned in the counterclockwise direction, the tape 16 runs from the illustrated starting position in the direction of the arrow shown in FIG. 1 and the recorded announcement text is reproduced by a reproducing magnetic head 18. After the reproduction is terminated the tape has to be moved back to the illustrated starting position and this is performed by turning the wind-up reel 14 in the clockwise direction. The recorded text can be reproduced again thereafter.

Coupling openings 12a, 14a are provided in hubs of reels 12, 14 to enable the same to be driven, these openings being engaged by corresponding coupling pins 20a, 22a on driving wheels 20, 22 of the apparatus (not shown in any detail) when the cassette 10 is inserted in the latter. These driving wheels are mounted on a carrier plate 24 in the apparatus.

An electric driving motor 26 is arranged on the carrier plate 24 and the shaft 26a thereof always turns in the counterclockwise direction when the motor is in operation. This shaft is coupled through belt 28 with a shifting wheel 30 which may peripherally be in the form of a friction or toothed wheel. The other driving wheels will correspondingly have either a friction covering or teeth at the periphery. The wheel 30 has a mounting pin 30a received in a guide groove 24a in the carrier plate 24 and can be swung from the engagement position with wheel 20 illustrated in the drawings into engagement with an intermediate wheel 31 in permanent engagement with the wheel 22. Shifting of the wheel 30 therefore transmits the driving movement either to wheel 20 or to wheel 22 and thus causes the required direction of the movement of tape 16.

In apparatus for automatic telephone answering, use is frequently made of cassettes of this character for storing an announcement to be given on this telephone apparatus to a remote caller. The announcement, the duration of which is limited to a predetermined period, is dictated or recorded by the proprietor of the telephone apparatus on to the magnetic tape and the cassette placed in the apparatus, which has the driving mechanism illustrated in FIG. 2. A switching arrangement is provided in the electrical equipment of this apparatus for performing the following automatic functions:

1. When the ringing signals of the remote caller are received the operating mechanism of the answering cassette has to be brought into operation, the exchange loop (of the telephone company line, also known as the post office line) has to be closed and the announcement has to be transmitted to the caller.

2. At a predetermined period (about 60 seconds) after the end of the announcement, the magnetic tape has to be wound up again into the starting position and the driving motor then stopped.

A control switching for this purpose in accordance with the present invention is diagrammatically illustrated in FIG. 3. The symbol 32 designates a signal detector to the input of which the incoming ringing signals are conducted. The detector 32 emits pulses 32a at its output side, the first of which effects the closure of a switch 34 to switch on the driving motor 26.

Since the cassette and its driving mechanism are in the positions illustrated in FIGS. 1 and 2 in the rest condition, the switching on of the driving motor 26 moves the driving wheel 20 and the wind-up reel 14 in the clockwise direction and the tape 16 is moved in the direction opposite to that of the arrow in FIG. 1. Since however, the tape 16 has been completely unwound from the reel 12 in this position, it cannot move further in this opposite direction. A slipping movement takes place between the driving elements 26a, 28, 30, 20 and the resistance set up by the stationary tape 16 calls for an increased current consumption at the driving motor 26.

A current variation detector 36 is provided in the control switching and this is arranged to emit an OFF-pulse, 36a in the event of increased current consumption at motor 26 and of a consequential voltage drop in the circuit, and said OFF-pulse 36a is transmitted from the detector 36 to the switch 34 through line 36: The switch 34 is opened in response to the increase in current signal 36a and the driving motor 26 is stopped only when the pulse 36a is alone present on the switch 34. When both pulses 32a and 36a are present on the switch 34, the closing pulse 32a is predominant despite of the OFF-pulse 36a (as later described ) and therefore the switch remains closed.

Pulse 36a is likewise sent to one input terminal of an AND-gate 38 through line 36. The pulses 32a from the detector 32 are also passed through conductor 41 to the AND-gate 38 and the AND-gate 38 is operated when, and only when, the two pulses 32a and 36a occur simultaneously to effect an energization of an element 40 to move the shifting wheel 30 from the position thereof illustrated in full line in FIG. 1 into the dotted line position thereof.

A time delay appears between the first pulse 32a and the first pulse 36a. This delay is always constant and arises from several mechanical and electrical factors of the apparatus, e.g. the acceleration constant of the driving motor 26, the delay factor of the detector 36 and of other electrical elements of the control switching arrangement of said apparatus described below in connection with FIG. 4. A suitable delaying RC-member in said switching is provided for the purpose of adjusting the timing of said pulse 36a. In the present embodiment, the first pulse 36a is delayed with respect to the first pulse 32a in such manner that the first pulse 36a appears at the switch 34 and at the AND-gate 38 only after the second pulse 32a is delivered thereto.

The following pulse 32a from the detector 32 initiates closure of the switch 34 and thus an operation of the driving motor 26. Since however, the delayed first pulse 36a is also present at an input terminal of the AND-gate 38, this switches the electromagnet 40 on to couple the shifting wheel 30 with the intermediate wheel 31 with effect a movement of the shifting wheel 30 to the right in FIG. 2 to whereby the tape 16 is driven by the driving elements 22, 12 in the wind-off or forward direction and the recorded announcement starts. At more or less the same time as the tape 16 moves in the wind-off direction, the mentioned exchange loop in the telephone company line in the telephone apparatus is closed by a switch (not shown) in the apparatus and the ringing circuit is cut off while simultaneously opening the communication line for transmission of a message . As a result, the ringing signals and, therefore, the pulses 32a cease. Nevertheless, the motor 26 will still continue to operate.

After the full announcement has been given, a time switch 40B times out and deenergizes the electromagnet 40 to effect a movement of the shifting wheel 30 over into the full line position designated in FIG. 2 which implements the return of the tape in the position illustrated in FIG. 1. As soon as this position has been reached an increased current consumption is produced at the motor 26 because the tape 16 has been completely wound off reel 12. The current variation detector 36 now emits a pulse 36a which opens switch 34 (since no pulses 32a are present) to interrupt the current supply to the motor 26. The working cycle is terminated and the tape and the means for driving the tape have resumed their FIGS. 1 and 2 positions whereby they stand ready to start a new announcing cycle by the process described above on reception of new ringing signals from the telephone company line.

FIG. 4 shows in detail the set-up of the control switching which have been indicated heretofore only in block diagram form in FIG. 3. Pulse 32a from the detector 32 is applied through a resistance 42 to the base of a transistor 44 which, with a further transistor 46, constitutes a Flip-Flop. Resistances 48, 50, 52 are interconnected in a nodal point 54 and associated with the transistors 44, 46. Nodal point 54 is coupled to the collector of a transistor 56 which is connected to a further transistor 60 through a resistance 58. At the base of transistor 60 are connected a condenser 62 and a resistance 64 which constitute an RC-member. A dropping resistance for the driving motor 26 is indicated at 66. The current supply to motor 26 takes place via collector/emitter section of a transistor 68 as soon as the latter becomes conductive. A variable resistance associated with the driving motor 26 for regulating the rate of rotation of the latter is indicated at 70. Further resistances 72–78 are incorporated in the switching in the manner illustrated.

As soon as a pulse 32a is applied at the base of transistor 44, the latter becomes conductive as does the transistor 46 also. Since these two transistors 44, 46 constitute a Flip-Flop self-holding in switching state a positive voltage is applied permanently at the nodal point 80 and thus the transistor 68 is rendered conductive so that the driving motor 26 is supplied with current through its dropping resistance 66 and operates.

If however, the driving motor 26 is forced into an increased current consumption because of the braking effect of the tape 16 referred to above, meaning that the tape is already rewound and ready for play, there is a voltage drop at resistance 66 with the consequence that the transistors 60–56 are rendered conductive and the transistors 44 and 46, hitherto conductive, are switched into OFF-condition. The nodal point 80 will become de-energized and transistor 68 is rendered non-conductive as a result of which, however, the current supply to the driving motor 26 is discontinued. The voltage signal applied to RC-members 62, 64 cause a delay in the nodal point 82 so that the transistors 60, 56 are only responsive to a high magnitude voltage drop of extended duration, longer than the time duration between incoming ringing signals, across the dropping resistor 66. Pulse 36a generated by the conductance of the transistor 60 is delivered to an input terminal of AND-gate 38. When the next received pulse 32a passes through the resistance 42, a control voltage for the transistor 44 will exist and be sufficient to turn the transistors 44 and 46 on again despite the OFF-pulse at nodal point 54, this circumstance being stipulated by the voltage division at 42, 48. This will effect a turning off of transistors 60, 56. Current is again received by driving motor 26 and the driving motor 26 is therefore brought into operation. Since the now pulse 32a is at the same time conducted via line 41 to the other terminal of the AND-gate 38, the pulses 32a and 36a are both available at the AND-gate 38 to effect an energizing of the electromagnet 40. The electromagnet 40, has an armature 40a which engages the bearing pin 30a of the shifting wheel 30 and when the electromagnet is energized, effects a shifting of the shifting wheel 30 from the position of engagement with wheel 20 into driving relationship with wheel 22. A spring 84 bears against the side of the bearing pin 30a opposite to the element 40 and implements the changeover of wheel 30 as soon as the time switch 40B mentioned above becomes effective at the end of the announcement.

It is to be pointed out that the invention is not limited solely to the embodiment which has been described above. Other variations are possible, for example where the IN-pulse 32a can be produced with the help of a switch operated by a hand key (microphone key), a control switching described can be exercised for controlling purposes for reproduction and recording of the text of the announcement.

The embodiments of the invention in which an exclusive property or privilege is claimed are defined as follows:

1. A circuit arrangement for use in a telephone answering apparatus responsive to ringing signals from a telephone company line and having a magnetic tape and a magnetic tape drive system, said circuit arrangement comprising:
   detecting means for detecting said ringing signals;
   first means for first effecting a drive to completely rewind said magnetic tape in response to the detected ringing signals from the telephone company line;
   second means for producing a signal indicating that said magnetic tape is completely rewound; and
   third means for effecting a forward play of said magnetic tape in response to a simultaneous occurrence of a ringing signal and said indicating signal.

2. A circuit arrangement according to claim 1, wherein said third means comprises an AND-gate activatable by said simultaneous occurrence of a ringing signal and said indicating signal and a servo means connected in circuit with said AND-gate for effecting said forward play of said magnetic tape in response to an activation of said AND-gate by said ringing signal and said indicating signal.

3. A circuit arrangement according to claim 2, wherein said magnetic tape drive system includes an electric drive motor and shiftable means for effecting a shifting of the drive of said electric drive motor between said rewind direction and said forward play direction; and
   wherein said first means includes a switch responsive to said ringing signal to effect an energizing of said electric drive motor.

4. A circuit arrangement according to claim 3, wherein said tape drive system further includes a pair of friction wheels; and
   wherein said shiftable means includes a shifting wheel driven for rotation by said electric drive motor and resilient means for urging said shifting wheel into engagement with one of said friction wheels to effect a driving thereof in the rewind direction, said shiftable means further including an electromagnet coupled to said shifting wheel, an activation of said AND-gate effecting an energization of said electromagnet and a shifting of said shifting wheel to engagement with the other of said friction wheels to effect a driving thereof in the forward play direction.

5. A circuit arrangement according to claim 4, wherein said third means includes a timer having a predetermined time interval programmed therein, said timer being responsive to said activation of said AND-gate for starting the running of said predetermined time interval;
   wherein said electromagnet is coupled to said timer and the energization thereof being limited to the time within said predetermined time intervals; and
   wherein a timing out of said timer effects a deenergizing of said electromagnet and a subsequent movement of said shifting wheel under the urging of said resilient means to cause a rewinding of said magnetic tape.

6. A circuit arrangement according to claim 3, wherein said second means comprises a current increase detector connected in circuit with said electric drive motor, a complete rewinding of said magnetic tape by said magnetic tape drive system causing said electric drive motor to draw more current which is detected by said current increase detector, said current increase detector having switch means therein responsive to a predefined threshold value of current to produce said indicating signal.

7. A circuit arrangement according to claim 6, wherein said current increase detector includes an RC circuit for delaying the occurrence of said threshold value of current until the occurrence of a second ringing signal.

8. A circuit arrangement according to claim 7, wherein said switch means effects a deenergizing of said electric drive motor in the absence of a second ringing signal.

9. A circuit arrangement for use in a telephone answering apparatus having an input terminal for receiving ringing signals from a telephone company line, a magnetic tape, electric motor means and shifting means for shifting an output from said electric motor means between a forward play drive position and a rewind drive position, comprising:
   first detector means for detecting ringing signals and producing a first pulse in response to each ringing signal detected on said telephone company line;
   first switching means having a pair of input terminals, one of which is connected in circuit with said first detector means for effecting an energizing of said electric motor in response to the occurrence of said first pulse at said one input terminal to first drive said magnetic tape in a rewind direction;
   second detector means for detecting a pair of operating conditions on said electric motor means and producing a second pulse in response to one of said operating conditions, said one of said operating conditions occurring when said magnetic tape is completely rewound, the other of said input terminals of said first switching means being connected in circuit with second detector means, said first switching means effecting a deenergizing of said electric motor means in response to said second pulse at said other input terminal; and second switching means responsive to said first and second pulses to effect a shifting of said shifting means to shift the output of said electric motor means to a forward play position, the occurrence of said first pulse being sufficient to override said second pulse to effect an energizing of said electric motor.

10. The circuit arrangement according to claim 9, wherein said second switching means comprises AND-gate means and an electromagnet responsive to an activation of said AND-gate means by said first and second pulses, said responsiveness of said electromagnet effecting a shifting of said shifting means to shift the output of said electric motor means to a forward play position to effect a forward play of said magnetic tape.

11. A circuit arrangement according to claim 10, wherein said second switching means further comprises a timing switch having a predefined time interval characteristics and which is activated in response to an activation of said AND-gate means by said first and second pulses, said electromagnet being energized in response to an activation of said time switch to effect a maintenance of the energization of said electromagnet for a time interval determined by said time switch.

* * * * *